(12) United States Patent
Bahammam (10) Patent No.: US 11,311,355 B1
(45) Date of Patent: Apr. 26, 2022

(54) METHOD FOR MAKING HINGED DENTAL TRAY

(71) Applicant: King Abdulaziz University, Jeddah (SA)

(72) Inventor: Hammam Ahmed Salim Bahammam, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/493,073

(22) Filed: Oct. 4, 2021

Related U.S. Application Data (63) Continuation of application No. 17/339,389, filed on Jun. 4, 2021, now Pat. No. 11,179,228.

(51) Int. Cl.
*A61C 9/00* (2006.01)
(52) U.S. Cl.
CPC .................................. *A61C 9/0006* (2013.01)
(58) Field of Classification Search
CPC .............................................. A61C 9/00–0013
USPC ...................................... 433/34, 37, 44, 214
See application file for complete search history.

(56) References Cited

U.S. PATENT DOCUMENTS

| | | | |
|---|---|---|---|
| 3,878,610 A * | 4/1975 | Coscina | A61C 9/0006 433/37 |
| 4,459,107 A * | 7/1984 | Weissman | A61C 9/00 433/213 |
| 4,668,188 A * | 5/1987 | Wolfenson | A63B 71/085 433/37 |
| 5,336,086 A * | 8/1994 | Simmen | A61C 9/0006 D24/176 |
| 6,206,692 B1 * | 3/2001 | Komiyama | A61C 9/0006 433/41 |
| 6,749,428 B2 * | 6/2004 | DiMarino | A61C 9/0006 433/37 |
| 7,021,929 B2 * | 4/2006 | DiMarino | A61C 9/0006 433/37 |
| 7,270,540 B2 * | 9/2007 | Skinner | A61C 9/0006 433/43 |
| 9,283,062 B2 * | 3/2016 | Kim | A61C 13/082 |
| 11,179,228 B1 * | 11/2021 | Bahammam | A61C 9/0006 |
| 2009/0298007 A1 * | 12/2009 | Walter | A61C 9/0006 433/38 |

(Continued)

FOREIGN PATENT DOCUMENTS

DE   20 2013 001 910 U1   5/2013

*Primary Examiner* — Edward Moran
*Assistant Examiner* — Matthew P Saunders
(74) *Attorney, Agent, or Firm* — Oblon, McClelland, Maier & Neustadt, L.L.P.

(57) ABSTRACT

A dental impression tray device for taking a dental impression is provided. The dental impression tray device includes a dental impression tray main body and a handle bar connected to the dental impression tray main body. The dental impression tray main body includes a cavity which is formed by an outer curvature wall surface and a base surface. The outer curvature wall surface includes a first finger rest and a second finger rest positioned in a first symmetrical half and a second symmetrical half, respectively, of the dental impression tray device. Each of the first finger rest and the second finger rest has a flat surface shaped as a semi ellipse which has a height less than half of a diameter thereof. Further, the semi ellipse is positioned at a first angle with respect to a line of symmetry.

8 Claims, 8 Drawing Sheets

(56) References Cited

U.S. PATENT DOCUMENTS

2016/0250004 A1 9/2016 Dimarino

* cited by examiner

┌─────────────────────────────────────────────┐
│ Fabricating a dental impression tray comprising a dental impression
│ tray main body and a handle bar connected to the dental impression
│ tray main body, the dental impression tray main body includes a
│ cavity formed by an outer curvature wall surface and a base surface,  — 502
│ such that the outer curvature wall surface includes a first finger rest
│ and a second finger rest resting on an outer curvature wall surface
│ arc
└─────────────────────────────────────────────┘
                        ↓
┌─────────────────────────────────────────────┐
│ Symmetrically modeling the dental impression tray into a first
│ symmetrical half and a second symmetrical half by a line of symmetry,
│ wherein the first finger rest is positioned in the first symmetrical half  — 504
│ and the second finger rest is positioned in the second
│ symmetrical half
└─────────────────────────────────────────────┘

FIG. 7

METHOD FOR MAKING HINGED DENTAL TRAY

CROSS-REFERENCE TO RELATED APPLICATIONS

The present application is a Continuation of U.S. application Ser. No. 17/339,389, now allowed, having a filing date of Jun. 4, 2021.

BACKGROUND

Field of the Invention

The present disclosure relates to a dental device and, more particularly relates, to a dental impression tray device for holding an impression material and a method of manufacturing the dental impression tray device.

Description of the Related Art

Dental occlusion is an important aspect in the digestion process. One way to evaluate the bite is by taking impression of the teeth. To take an impression of the teeth, an impression tray is used to carry impression material. The impression tray may be made of a plastic or metal and can be disposable or reusable based on the application and material. Moreover, the impression of the teeth may be used to evaluate the need of orthodontic treatment, fabricate space maintainers and indirect fillings. One of the difficulties faced by dentists while taking a dental impression is uncontrolled opening and closing of the mouth of patients. Such movement of the mouth may lead to accidental biting, which in turn may lead to trauma and injury to the fingers of dentists or the oral tissue of the patients, which may lead to cross infection and transmission of diseases between the dentist and the patient.

People with special needs deserve a better quality of treatment. Particularly, patients with neurological problems cannot control their mouth movement. Further, accidentally closing the mouth without control may lead to aspiration of materials in an impression tray which in turn may lead to serious health complications.

While taking an impression, two fingers are placed over the impression tray to stabilize it. Patients with special needs might accidently close their mouth and bite dentist's fingers as they cannot control their mouth movement. Hence, there remains a need to develop an impression tray for carrying impression material and to mitigate the aforementioned problems and shortcomings of conventional impression trays.

SUMMARY

In one aspect of the present disclosure, a dental impression tray is disclosed. The dental impression tray is used for holding an impression material to be placed into an oral cavity for taking a dental impression. The dental impression tray includes a dental impression tray main body and a handle bar connected to the dental impression tray main body. The dental impression tray main body includes a cavity in which the impression material is to be placed. The cavity is defined by an outer curvature wall surface and a base surface, such that the outer curvature wall surface includes a plurality of finger rests resting on an outer curvature wall surface arc. The plurality of finger rests includes a first finger rest and a second finger rest. A center portion of the outer curvature wall surface is connected to the handle bar by an attachment element. The dental impression tray is divided into two symmetrical halves by a line of symmetry that runs through the middle of the handle bar, the attachment element, and the dental impression tray main body. The two symmetrical halves include a first symmetrical half and a second symmetrical half. The first finger rest is positioned in the first symmetrical half and the second finger rest is positioned in the second symmetrical half.

The first symmetrical half includes the first finger rest which includes a flat surface that extends from a first end of the center portion of the outer curvature wall surface on the first symmetrical half of the dental impression tray main body. The flat surface of the first finger rest shaped as a semi ellipse and a first end of a diameter of the semi ellipse starts at a first distance away from the first end of the center portion of the outer curvature wall surface. The first distance equals an arc length that is in a range of 0.5 centimeter (cm) to 1.5 cm on the outer curvature wall surface and the arc length is less than half the length of the diameter of the semi ellipse. The semi ellipse has a height that is less than half of the diameter of the semi ellipse. The diameter of the semi ellipse overlays on the outer curvature wall surface of the dental impression tray main body and the height is measured from a midpoint on the diameter of the semi ellipse till a farthest point on a circumference of the semi ellipse away from the diameter. Further, the semi ellipse is positioned at a first angle that is less than 50 degree, such that the first angle is an angle between a normal passing through the midpoint of the diameter of the semi ellipse and the line of symmetry that runs through the middle of the dental impression tray main body.

The second symmetrical half includes the second finger rest which includes a flat surface that extends from a second end of the center portion of the outer curvature wall surface on the second symmetrical half of the dental impression tray main body. The flat surface of the second finger rest shaped as a semi ellipse and a second end of a diameter of the semi ellipse starts at a second distance away from the second end of the center portion of the outer curvature wall surface. The second distance equals an arc length that is in a range of 0.5 cm to 1.5 cm on the outer curvature wall surface and the arc length is less than half the length of the diameter of the semi ellipse. The semi ellipse has a height that is less than half of the diameter of the semi ellipse. The diameter of the semi ellipse overlays on the outer curvature wall surface of the dental impression tray main body and the height is measured from a midpoint on the diameter of the semi ellipse till a farthest point on a circumference of the semi ellipse away from the diameter. Further, the semi ellipse is positioned at a second angle that is less than 50 degree, such that the second angle is an angle between a normal passing through the midpoint of the diameter of the semi ellipse and the line of symmetry that runs through the middle of the dental impression tray main body.

In an embodiment, the dental impression tray is an upper dental impression tray.

In an embodiment, the dental impression tray is a lower dental impression tray.

In an embodiment, the cavity is defined by the outer curvature wall surface of the lower dental impression tray, an inner curvature surface of the lower dental impression tray, and the base surface connecting the outer curvature surface and the inner curvature surface.

In an embodiment, the plurality of finger rests includes a third finger rest in the first symmetrical half and a fourth finger rest in the second symmetrical half.

In an embodiment, the height of the semi ellipse corresponding to the first finger rest in the first symmetrical half and the height of the semi ellipse corresponding to the second finger rest in the second symmetrical half is 1.5 cm.

In an embodiment, the diameter of the semi ellipse corresponding to the first finger rest in the first symmetrical half and the diameter of the semi ellipse corresponding to the second finger rest in the second symmetrical half is 4 cm.

In one aspect of the present disclosure, a dental impression tray is disclosed. The dental impression tray is used for holding an impression material to be placed into an oral cavity for taking a dental impression. The dental impression tray includes a dental impression tray main body and a handle bar connected to the dental impression tray main body. The dental impression tray main body includes a cavity in which the impression material is to be placed. The cavity is formed by an outer curvature wall surface and a base surface, such that the outer curvature wall surface includes a plurality of finger rests resting on an outer curvature wall surface arc. The plurality of finger rests includes a first finger rest and a second finger rest, and a center portion of the outer curvature wall surface is connected to the handle bar by an attachment element. The dental impression tray is divided into two symmetrical halves by a line of symmetry that runs through the middle of the handle bar, the attachment element, and the dental impression tray main body. The two symmetrical halves include a first symmetrical half and a second symmetrical half. The first finger rest is positioned in the first symmetrical half and the second finger rest is positioned in the second symmetrical half.

The first symmetrical half includes the first finger rest comprising a flat surface that extends from a first end of the center portion of the outer curvature wall surface on the first symmetrical half of the dental impression tray main body. The flat surface of the first finger rest shaped as a semi-circle and a first end of a diameter of the semi-circle starts at a first distance away from the first end of the center portion of the outer curvature wall surface. The first distance equals an arc length that is in a range of 0.5 cm to 1.5 cm on the outer curvature wall surface and the arc length is less than half the length of the diameter of the semi-circle. The semi-circle has a height that is equal to half of the diameter of the semi-circle. The height of the semi-circle is 2 cm, and the diameter of the semi-circle is 4 cm. The diameter of the semi-circle overlays on the outer curvature wall surface of the dental impression tray main body. The height is measured from a midpoint on the diameter of the semi-circle till a farthest point on a circumference of the semi-circle away from the diameter. Further, the semi-circle is positioned at a first angle that is 45 degree. The first angle is an angle between a normal passing through the midpoint of the diameter of the semi-circle and the line of symmetry that runs through the middle of the dental impression tray main body.

The second symmetrical half includes the second finger rest comprising a flat surface that extends from a second end of the center portion of the outer curvature wall surface on the second symmetrical half of the dental impression tray main body. The flat surface of the second finger rest shaped as a semi-circle and a second end of a diameter of the semi-circle starts at a second distance away from the second end of the center portion of the outer curvature wall surface. The second distance equals an arc length that is in a range of 0.5 cm to 1.5 cm on the outer curvature wall surface and the arc length is less than half the length of the diameter of the semi-circle. The semi-circle has a height that is equal to half of the diameter of the semi-circle. The height of the semi-circle is 2 cm, and the diameter of the semi-circle is 4 cm. The diameter of the semi-circle overlays on the outer curvature wall surface of the dental impression tray main body and the height is measured from a midpoint on the diameter of the semi-circle till a farthest point on a circumference of the semi-circle away from the diameter. Further, the semi-circle is positioned at a second angle that is 45 degree. The second angle is an angle between a normal passing through the midpoint of the diameter of the semi-circle and the line of symmetry that runs through the middle of the dental impression tray main body.

In an embodiment, the dental impression tray is an upper dental impression tray.

In an embodiment, the dental impression tray is a lower dental impression tray.

In an embodiment, the dental impression tray is made from at least one of a plastic material, thermoplastic polymer, a metal, a metal plated with a second material, or a non-metallic material.

In another aspect of the present disclosure, a method of manufacturing a dental impression tray is disclosed. The dental impression tray is used for holding an impression material to be placed into an oral cavity for taking a dental impression. The method includes fabricating a dental impression tray comprising a dental impression tray main body and a handle bar connected to the dental impression tray main body. The dental impression tray main body includes a cavity in which the impression material is to be placed. The cavity is formed by an outer curvature wall surface and a base surface, such that the outer curvature wall surface includes a plurality of finger rests resting on an outer curvature wall surface arc. The plurality of finger rests includes a first finger rest and a second finger rest, and a center portion of the outer curvature wall surface is connected to the handle bar by an attachment element.

The method of fabricating the dental impression tray further includes symmetrically modeling the dental impression tray into two symmetrical halves by a line of symmetry that runs through the middle of the handle bar, the attachment element, and the dental impression tray main body. The two symmetrical halves include a first symmetrical half and a second symmetrical half. The first finger rest is positioned in the first symmetrical half and the second finger rest is positioned in the second symmetrical half The first symmetrical half includes the first finger rest comprising a flat surface that extends from a first end of the center portion of the outer curvature wall surface on the first symmetrical half of the dental impression tray main body. The flat surface of the first finger rest shaped as a semi ellipse and a first end of a diameter of the semi ellipse starts at a first distance away from the first end of the center portion of the outer curvature wall surface. The first distance equals an arc length that is in a range of 0.5 cm to 1.5 cm on the outer curvature wall surface circumference and the arc length is less than half the length of the diameter of the semi ellipse. The semi ellipse has a height that is less than half of the diameter of the semi ellipse. The diameter of the semi ellipse overlays on the outer curvature wall surface of the dental impression tray main body and the height is measured from a midpoint on the diameter of the semi ellipse till a farthest point on a circumference of the semi ellipse away from the diameter. Further, the semi ellipse is positioned at a first angle that is less than 50 degree, such that the first angle is an angle between a normal passing through the midpoint of the diameter of the semi ellipse and the line of symmetry that runs through the middle of the dental impression tray main body.

The second symmetrical half includes the second finger rest comprising a flat surface that extends from a second end of the center portion of the outer curvature wall surface on the second symmetrical half of the dental impression tray main body. The flat surface of the second finger rest shaped as a semi ellipse and a second end of a diameter of the semi ellipse starts at a second distance away from the second end of the center portion of the outer curvature wall surface. The second distance equals an arc length that is in the range of 0.5 cm to 1.5 cm on the outer curvature wall surface and the arc length is less than half the length of a diameter of the semi ellipse. The semi ellipse has a height that is less than half of the diameter of the semi ellipse. The diameter of the semi ellipse overlays on the outer curvature wall surface of the dental impression tray main body and the height is measured from a midpoint on the diameter of the semi ellipse till a farthest point on a circumference of the semi ellipse away from the diameter. Further, the semi ellipse is positioned at a second angle that is less than 50 degree, such that the second angle is an angle between a normal passing through the midpoint of the diameter of the semi ellipse and the line of symmetry that runs through the middle of the dental impression tray main body.

In an embodiment, the dental impression tray is an upper dental impression tray.

In an embodiment, the dental impression tray is a lower dental impression tray.

In an embodiment, the cavity is formed by the outer curvature wall surface, an inner curvature surface, and the base surface connecting the outer curvature surface and the inner curvature surface.

In an embodiment, the plurality of finger rests includes a third finger rest in the first symmetrical half and a fourth finger rest in the second symmetrical half.

In an embodiment, the height of the semi ellipse corresponding to the first finger rest in the first symmetrical half and the height of the semi ellipse corresponding to the second finger rest in the second symmetrical half is 1.5 cm.

In an embodiment, the diameter of the semi ellipse corresponding to the first finger rest in the first symmetrical half and the diameter of the semi ellipse corresponding to the second finger rest in the second symmetrical half is 4 cm.

In an embodiment, the dental impression tray device is made from at least one of a plastic material, thermoplastic polymer, a metal, a metal plated with a second material, or a non-metallic material.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features of the dental of the present disclosure, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
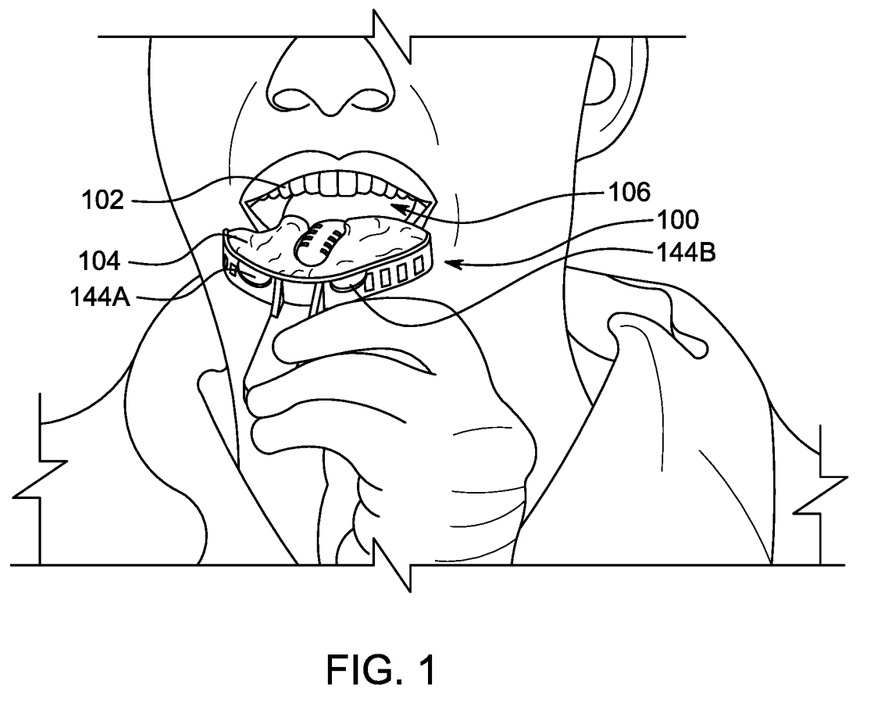
FIG. 1 is a perspective view of a dental impression tray device used for taking a dental impression of a maxillary tooth structure during a dental procedure, according to an embodiment of the present disclosure.

Referring to FIG. 1, is a perspective view of a dental impression tray device 100 used for taking a dental impression of maxillary tooth structure 102 during a dental procedure, according to an embodiment of the present disclosure. The dental impression tray device 100 is used for holding an impression material 104 to be placed into an oral cavity 106 for taking the dental impression of the maxillary tooth structure 102. The dental impression tray device 100 is designed in an arc shape to fit over the maxillary tooth structure 102 and gums in the oral cavity 106. During the dental procedure, when a dentist wants to take impression of a patient's teeth structure, the dentist carries a temporarily viscous compound, otherwise referred to as the impression material 104, in the dental impression tray device 100 and places over the maxillary tooth structure 102. The impression material 104 along with the dental impression tray device 100 is pushed against the maxillary tooth structure 102 to avoid any gap between the maxillary tooth structure 102 and the impression material 104. After the impression material 104 has hardened, the dental impression tray device 100 is removed, and the hardened impression material is then used as a mold. The same procedure is followed for taking a dental impression of a mandibular teeth structure using a dental impression tray device 200 explained in FIG. 4. The dental impression tray devices used for taking the dental impression of the mandibular teeth structure (not shown) and the maxillary tooth structure 102 may be manufactured in different sizes based on size of the oral cavity 106 of people at different ages.

Figure 2:
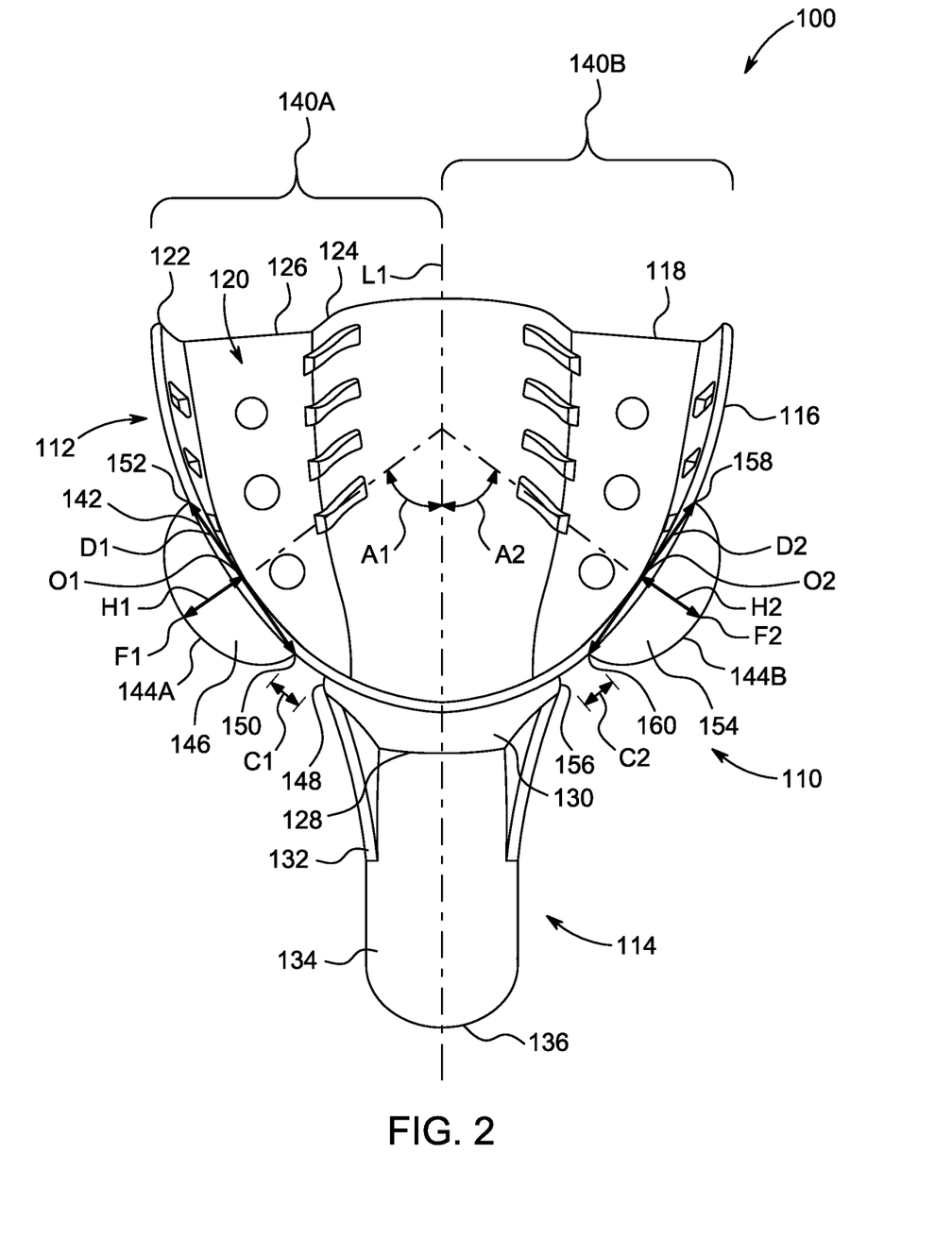
FIG. 2 is a top view of the dental impression tray device showing a pair of semi ellipse shaped finger rests, according to an embodiment of the present disclosure.

Referring to FIG. 2, a top view of the dental impression tray device 100 used for taking the dental impression of the maxillary tooth structure 102 is illustrated, according to an embodiment of the present disclosure. The dental impression tray device 100 includes a dental impression tray 110 having a dental impression tray main body 112 and a handle bar 114 connected to the dental impression tray main body 112. The dental impression tray 110 used for taking the dental impression of the maxillary tooth structure 102 or an upper jaw is otherwise referred to as an upper dental impression tray 110. In an embodiment, the dental impression tray device 100 is made from at least one of a plastic material such as an autopolymerizing acrylic resin, a thermoplastic polymer material such as a polystyrene material polymer, a metal, a metal plated with a second material, or a non-metallic material.

The dental impression tray main body 112 may be formed as an arcuate body having an arcuate edge 116 and a linear edge 118. The dental impression tray main body 112 includes a cavity 120 in which the impression material 104 is placed. The cavity 120 is formed by an outer curvature wall surface 122, an inner curvature surface 124, and a base surface 126 connecting the outer curvature wall surface 122 and the inner curvature surface 124. The outer curvature wall surface 122 may extend vertically from the base surface 126 along the arcuate edge 116 of the dental impression tray main body 112. The inner curvature surface 124 may project upward from the base surface 126, and thus define the cavity 120 with the outer curvature wall surface 122. The outer curvature wall surface 122, the inner curvature surface 124, and the base surface 126 together define the cavity 120 in the form of a channel along the arcuate edge 116 of the dental impression tray main body 112 to contain the impression material 104.

The handle bar 114 is an elongated flat body having a first end 128 attached to a center portion 130 of the outer curvature wall surface 122. Particularly, the handle bar 114 is attached to the center portion 130 of the outer curvature wall surface 122 opposite the linear edge 118 of the dental impression tray main body 112. In an embodiment, the handle bar 114 may be attached to the center portion 130 of the outer curvature wall surface 122 by an attachment element 132. The attachment element 132 may be a pair of projected wall surfaces defined at both sides of the elongated flat body of the handle bar 114 parallel to the outer curvature wall surface 122 to reinforce coupling between the handle bar 114 and the dental impression tray main body 112. The first end 128 of the handle bar 114 is attached to the center portion 130 of the outer curvature wall surface 122 along a longitudinal axis of the dental impression tray 110. The handle bar 114 has a flat surface 134 defined parallel to the base surface 126 of the dental impression tray main body 112. The handle bar 114 includes a second end 136, which is otherwise referred to as the free end 136, and has a length defined between the first end 128 and the second end 136. The length of the handle bar 114 is defined based on various factors including, but not limited to, size of the dental impression tray main body 112, and type of material of the handle bar 114. In one embodiment, the handle bar 114 and the dental impression tray main body 112 may be molded as a single piece. In another embodiment, the handle bar 114 and the dental impression tray main body 112 may be molded as individual pieces and attached using an adhesive, fastening members, or any other attachment mechanisms known in the art.

The dental impression tray 110 is divided into two symmetrical halves by a line of symmetry 11' that runs through middle of the handle bar 114, the attachment element 132, and the dental impression tray main body 112. The line of symmetry 11' may be otherwise referred to as the longitudinal axis of the dental impression tray 110. The two symmetrical halves include a first symmetrical half 140A and a second symmetrical half 140B.

In one embodiment, the outer curvature wall surface 122 of the dental impression tray main body 112 includes a plurality of finger rests including a first finger rest 144A and a second finger rest 144B. The first finger rest 144A is positioned in the first symmetrical half 140A and the second finger rest 144B is positioned in the second symmetrical half 140B.

The first finger rest 144A includes a flat surface 146 that extends from a first end 150 that is at a first distance 'C1' from a first end 148 of the center portion 130 of the outer curvature wall surface 122 on the first symmetrical half 140A of the dental impression tray main body 112. The flat surface 146 of the first finger rest 144A is shaped as a semi ellipse. The semi ellipse shape of the first finger rest 144A has a length, which is otherwise referred to as a diameter 'D1' of the semi ellipse, defined between the first end 150 and a second end 152 thereof. The diameter 'D1' of the semi ellipse may be measured along a major axis of the semi ellipse shape of the first finger rest 144A. The first end 150 of the diameter 'D1' of the semi ellipse starts at the first distance 'C1' away from the first end 148 of the center portion 130 of the outer curvature wall surface 122. In an embodiment, the first distance 'C1' equals an arc length that is in a range of 0.5 centimeter (cm) to 1.5 cm, and preferably of 0.6 cm, on the outer curvature wall surface 122. In an alternate embodiment, the arc length is less than half the length of the diameter 'D1' of the semi ellipse. The diameter 'D1' of the semi ellipse overlays on the outer curvature wall surface 122 of the dental impression tray main body 112. In an embodiment, the diameter 'D1' of the semi ellipse of the first finger rest 144A in the first symmetrical half 140A is 4 cm.

The semi ellipse shape of the first finger rest 144A has a height 'H1' that is less than half of the diameter 'D1' of the semi ellipse. In one embodiment, the height 'H1' may be measured from a midpoint 'O1' on the diameter 'D1' of the semi ellipse till a farthest point 'F1' on a circumference of the semi ellipse away from the diameter 'D1'. In another embodiment, the height 'H1' may be measured along a minor axis from the midpoint 'O1' on the diameter 'D1' of the semi ellipse. In an embodiment, the height 'H1' of the semi ellipse of the first finger rest 144A in the first symmetrical half 140A is 1.5 cm.

Further, the semi ellipse is positioned at a first angle 'A1' with respect to the line of symmetry 'L1' that runs through the middle of the dental impression tray main body 112. The first angle 'A1' is defined as an angle between a normal passing through the midpoint 'O1' of the diameter 'D1' of the semi ellipse and the line of symmetry 'L1' that runs through the middle of the dental impression tray main body 112. In an embodiment, the first angle 'A1' is less than 50 degrees.

The second finger rest 144B includes a flat surface 154 that extends from a second end 160 that is at a second distance 'C2' from a second end 156 of the center portion 130 of the outer curvature wall surface 122 on the second symmetrical half 140B of the dental impression tray main body 112. The flat surface 154 of the second finger rest 144B is shaped as a semi ellipse. The semi ellipse shape of the second finger rest 144B has a length, which is otherwise referred to as a diameter 'D2' of the semi ellipse, defined between a first end 158 and the second end 160 thereof. The diameter 'D2' of the semi ellipse may be measured along a major axis of the semi ellipse shape of the second finger rest 144B. The second end 160 of the diameter 'D2' of the semi ellipse starts at the second distance 'C2' away from the second end 156 of the center portion 130 of the outer curvature wall surface 122. In an embodiment, the second distance 'C2' equals an arc length that is in a range of 0.5 cm to 1.5 cm, and preferably of 0.6 cm, on the outer curvature wall surface 122. In an alternate embodiment, the arc length is less than half the length of the diameter 'D2' of the semi ellipse. The diameter 'D2' of the semi ellipse overlays on the outer curvature wall surface 122 of the dental impression tray main body 112. In an embodiment, the diameter 'D2' of the semi ellipse of the second finger rest 144B in the second symmetrical half 140B is 4 cm.

The semi ellipse has a height 'H2' that is less than half of the diameter 'D2' of the semi ellipse. The height 112' is measured from a midpoint 'O2' on the diameter 'D2' of the semi ellipse till a farthest point 'F2' on a circumference of the semi ellipse away from the diameter 'D2'. In an embodiment, the height 112' of the semi ellipse of the second finger rest 144B in the second symmetrical half 140B is 1.5 cm.

Further, the semi ellipse is positioned at a second angle 'A2' that is less than 50 degrees. The second angle 'A2' is an angle between a normal passing through the midpoint 'O2' of the diameter 'D2' of the semi ellipse and the line of symmetry 'L1' that runs through the middle of the dental impression tray main body 112.

Figure 3A:
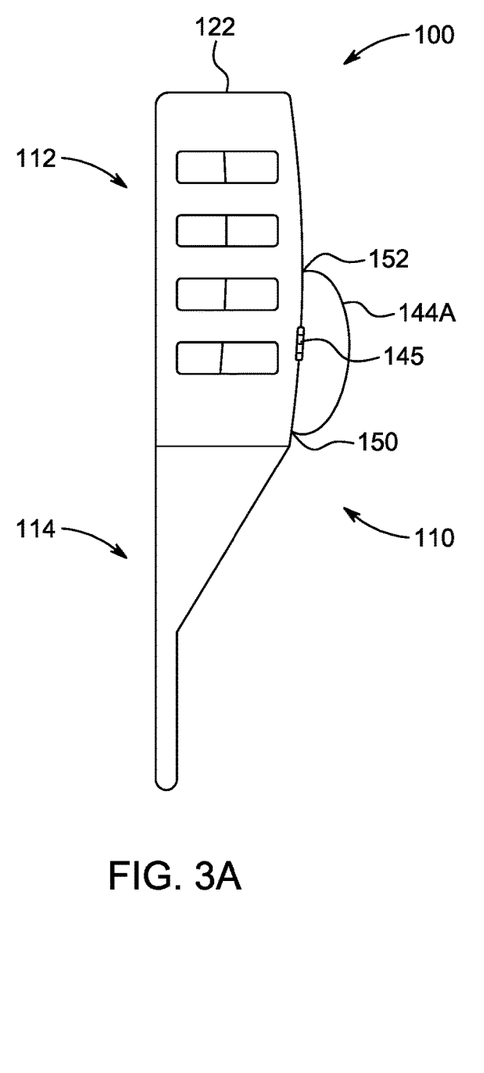
FIGS. 3A to 3D are side views of the dental impression tray device showing foldable configurations of the pair of semi ellipse shaped finger rests, according to various embodiments of the present disclosure.
Figure 3B:
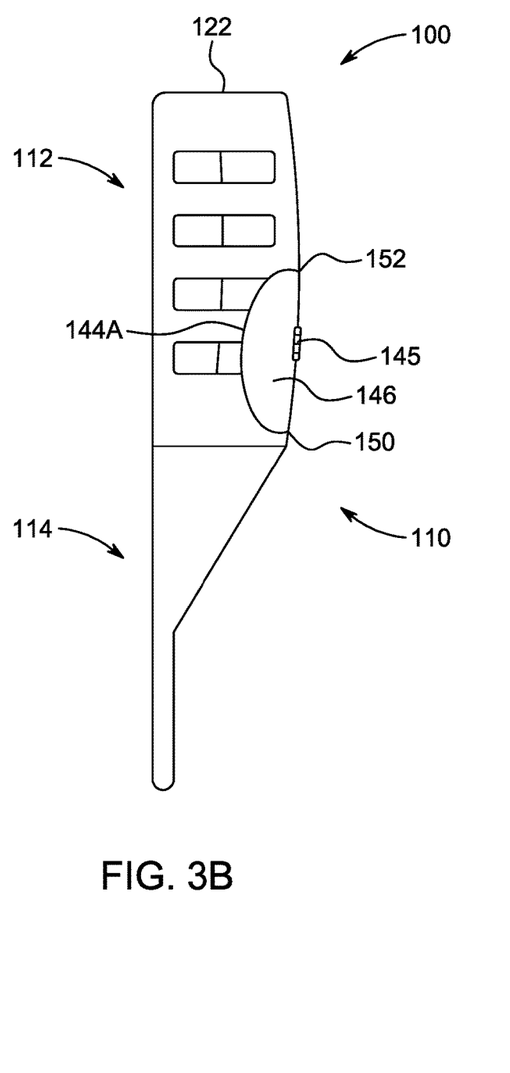

Referring to FIG. 3A and FIG. 3B, side views of the dental impression tray device 100 showing foldable configurations of the first finger rest 144A, according to various embodiments of the present disclosure. In an embodiment, the first finger rest 144A may be foldable along the diameter 'D1' of the semi ellipse, defined between the first end 150 and the second end 152 thereof. As shown in FIG. 3A, the first finger rest 144A, when folded in an upward direction, is positioned in a perpendicular position to a plane on which the dental impression tray main body 112 is disposed. As shown in FIG. 3B, the first finger rest 144A, when folded in a downward direction, has the flat surface 146 lay over the outer curvature wall surface 122 disposed below the diameter 'D1'. The first finger rest 144A may be coupled to the dental impression tray main body 112 by a plastic hinge 145. The plastic hinge 145 is configured to be in a locked position when the first finger rest 144A is positioned parallel to the plane on which the dental impression tray main body 112 is disposed and when the first finger rest 144A is positioned in the perpendicular position to the plane on which the dental impression tray main body 112 is disposed. Further, when a threshold external force is applied in the upward direction, the first finger rest 144A switches from the lock position to an unlock position until the first finger rest 144A is positioned in the perpendicular position to the plane on which the dental impression tray main body 112 is disposed. Further, when a threshold external force is applied in the downward direction, the first finger rest 144A switches from the lock position to the unlock position until the first finger rest 144A is folded downwards, such that the flat surface 146 lays over the outer curvature wall surface 122 disposed below the diameter 'D1'.

Figure 3C:
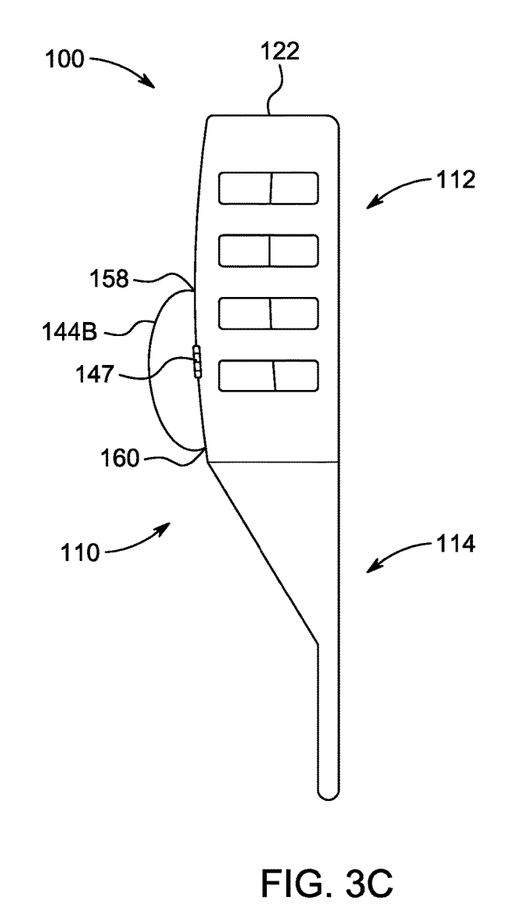
Figure 3D:
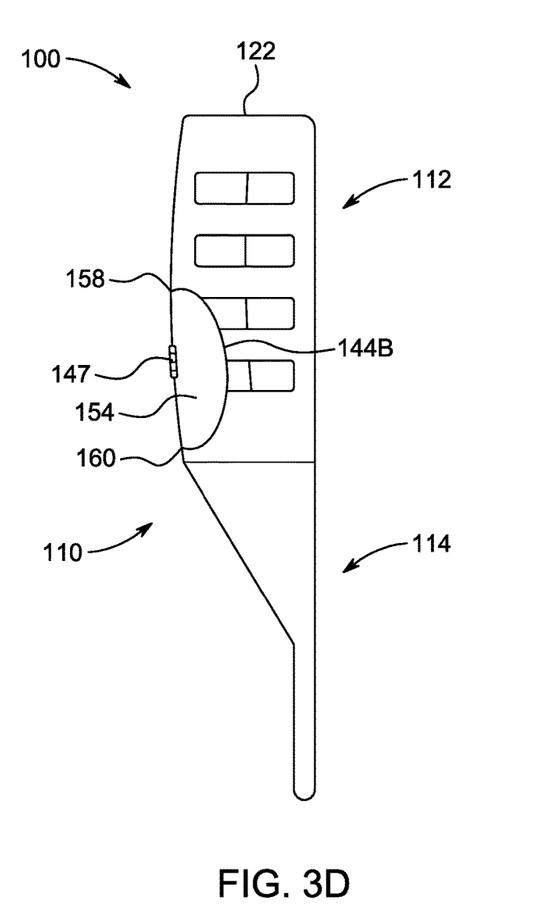

Referring to FIG. 3C and FIG. 3D, side views of the dental impression tray device 100 showing foldable configurations of the second finger rest 144B are illustrated, according to various embodiments of the present disclosure. In an embodiment, the second finger rest 144B may be foldable along the diameter 'D2' of the semi ellipse, defined between the first end 158 and the second end 160 thereof. As shown in FIG. 3C, the second finger rest 144B, when folded in an upward direction, is positioned in a perpendicular position to the plane on which the dental impression tray main body 112 is disposed. As shown in FIG. 3D, the second finger rest 144B, when folded in a downward direction, has the flat surface 154 lay over the outer curvature wall surface 122 disposed below the diameter 'D2'. The second finger rest 144B may be coupled to the dental impression tray main body 112 by a plastic hinge 147. The plastic hinge 147 is configured to be in a locked position when the second finger rest 144B is positioned parallel to the plane on which the dental impression tray main body 112 is disposed and when the second finger rest 144B is positioned in the perpendicular position to the plane on which the dental impression tray main body 112 is disposed. Further, when the threshold external force is applied in the upward direction, the second finger rest 144B switches from the lock position to an unlock position until the second finger rest 144B is positioned in the perpendicular position to the plane on which the dental impression tray main body 112 is disposed. Further, when the threshold external force is applied in the downward direction, the second finger rest 144B switches from the lock position to the unlock position until the second finger rest 144B is folded downwards, such that the flat surface 154 lays over the outer curvature wall surface 122 disposed below the diameter 'D2'.

During the dental procedure, as shown in FIG. 1, the dentist may fill the cavity 120 with the impression material 104. Further, the dentist may hold the handle bar 114 and place the dental impression tray device 100 over the maxillary tooth structure 102 of the patient. Upon placing the dental impression tray device 100, the dentist may place the fingers over the first finger rest 144A and the second finger rest 144B to push the dental impression tray device 100 towards the maxillary tooth structure 102. As the position of the first finger rest 144A and the second finger rest 144B are away from occlusion, any injury to the dentist's fingers during accidental closing of the mouth of the patient and cross infection may be avoided. Further, the first finger rest 144A and the second finger rest 144B may help the dentist to maintain stability in the dental impression tray device 100 until the impression material 104 is hardened, thereby aspiration of the impression material 104 is avoided. Moreover, the first finger rest 144A and the second finger rest 144B help the dentist to have more control over the dental impression tray device 100 during the dental procedure.

Figure 4:
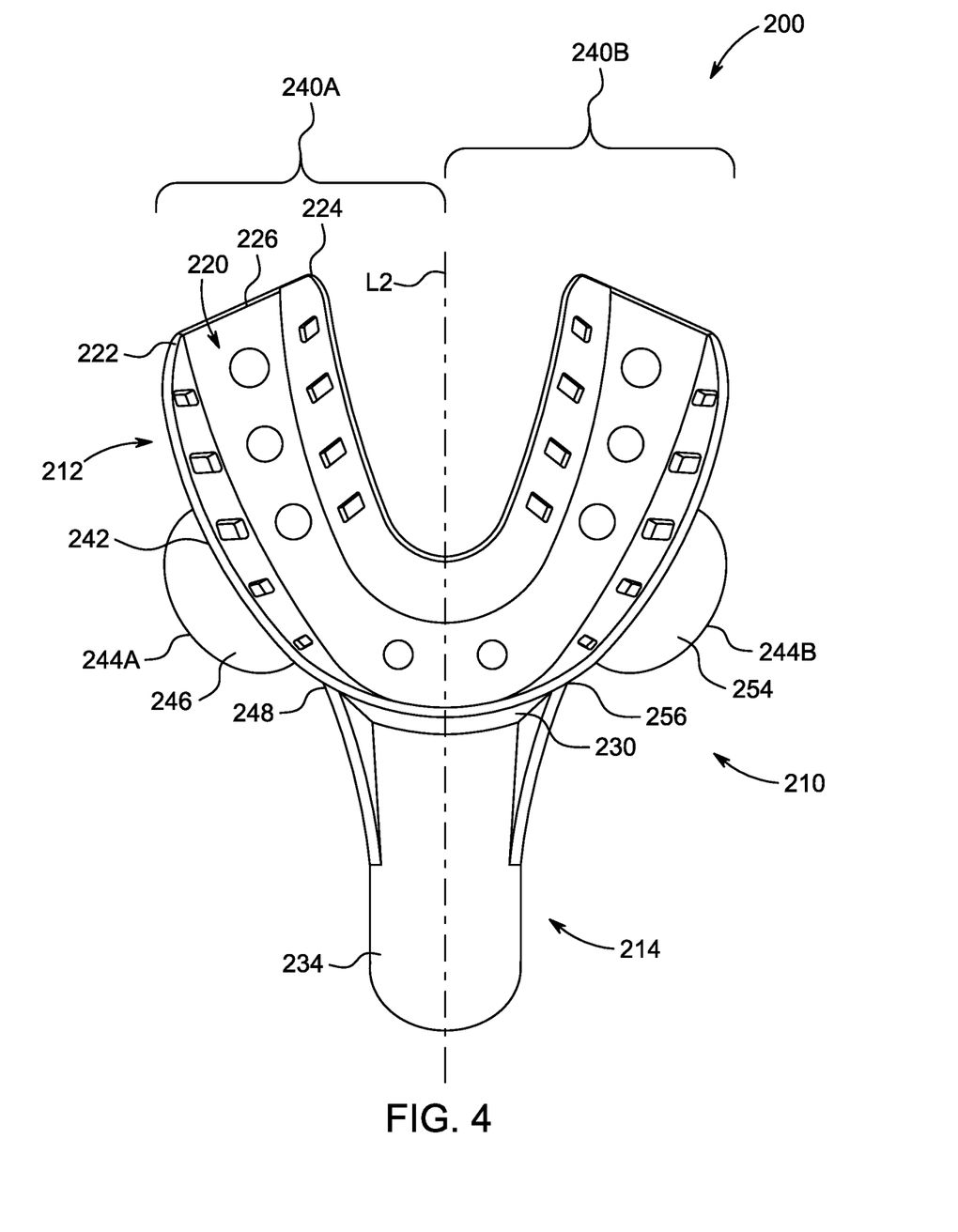
FIG. 4 is a bottom view of a dental impression tray device used for taking a dental impression of a mandibular teeth structure, according to an embodiment of the present disclosure.

Referring to FIG. 4, a bottom view of a dental impression tray device 200 used for taking a dental impression of a mandibular teeth structure (not shown) is illustrated, according to an embodiment of the present disclosure. The dental impression tray device 200 is used for holding the impression material 104 to be placed into the oral cavity 106 for taking the dental impression of the mandibular teeth structure. The dental impression tray device 200 may be designed in an arc shape to fit over the mandibular teeth structure and gums in the oral cavity 106. In an embodiment, the dental impression tray device 200 is made from at least one of a plastic material such as an autopolymerizing acrylic resin, a thermoplastic polymer material such as a polystyrene material polymer, a metal, a metal plated with a second material, or a non-metallic material.

The dental impression tray device 200 includes a dental impression tray 210 having a dental impression tray main body 212 and a handle bar 214 connected to the dental impression tray main body 212. The dental impression tray 210 used for taking the dental impression of the mandibular teeth structure or a lower jaw is otherwise referred to as a lower dental impression tray. The dental impression tray main body 212 includes a cavity 220 in which the impression material 104 is placed. The cavity 220 is formed by an outer curvature wall surface 222, an inner curvature wall surface 224, and a base surface 226 connecting the outer curvature wall surface 222 and the inner curvature wall surface 224. The outer curvature wall surface 222 and the inner curvature wall surface 224 may extend vertically from the base surface 226 to define the cavity 220. The handle bar 214 is attached to the outer curvature wall surface 222 along a longitudinal axis of the dental impression tray 210. The handle bar 214 has a flat surface 234 defined parallel to the base surface 226 of the dental impression tray main body 212. In one embodiment, the handle bar 214 and the dental impression tray main body 212 may be molded as a single piece. In another embodiment, the handle bar 214 and the dental impression tray main body 212 may be molded as individual pieces and attached using an adhesive, fastening members, or any other attachment mechanisms known in the art.

The dental impression tray 210 is divided into two symmetrical halves by a line of symmetry 12' that runs through middle of the handle bar 214 and the dental impression tray main body 212. The two symmetrical halves include a first symmetrical half 240A and a second symmetrical half 240B. The outer curvature wall surface 222 of the dental impression tray main body 212 includes a plurality of finger rests resting on an outer curvature wall surface arc 242. The plurality of finger rests includes a first finger rest 244A and a second finger rest 244B positioned in the first symmetrical half 240A and the second symmetrical half 240B, respectively, of the dental impression tray 210.

The first finger rest 244A and the second finger rest 244B are identical in construction and dimensional specification, therefore, the first finger rest 244A positioned in the first symmetrical half 240A of the dental impression tray 210 is described in detail herein below. Further, the construction and dimensional specification of the first finger rest 244A of the dental impression tray device 200 is identical to the construction and dimensional specification of the first finger rest 144A of the dental impression tray device 100. The first finger rest 244A includes a flat surface 246 that extends from a first end 248 of the center portion 230 of the outer curvature wall surface 222 on the first symmetrical half 240A of the dental impression tray main body 212. The flat surface 246 of the first finger rest 244A is shaped as a semi ellipse. Similarly, the second finger rest 244B includes a flat surface 254 that extends from a first end 256 of the center portion 230 of the outer curvature wall surface 222 on the second symmetrical half 240B of the dental impression tray main body 212. The flat surface 254 of the second finger rest 244B is shaped as a semi ellipse.

In an embodiment, the first finger rest 244A and the second finger rest 244B are also foldable substantially similar to the first finger rest 144A and the second finger rest 144B, as explained above. The description of the folding of the first finger rest 244A and the second finger rest 244B is not explained for the purposes of brevity.

Figure 5:
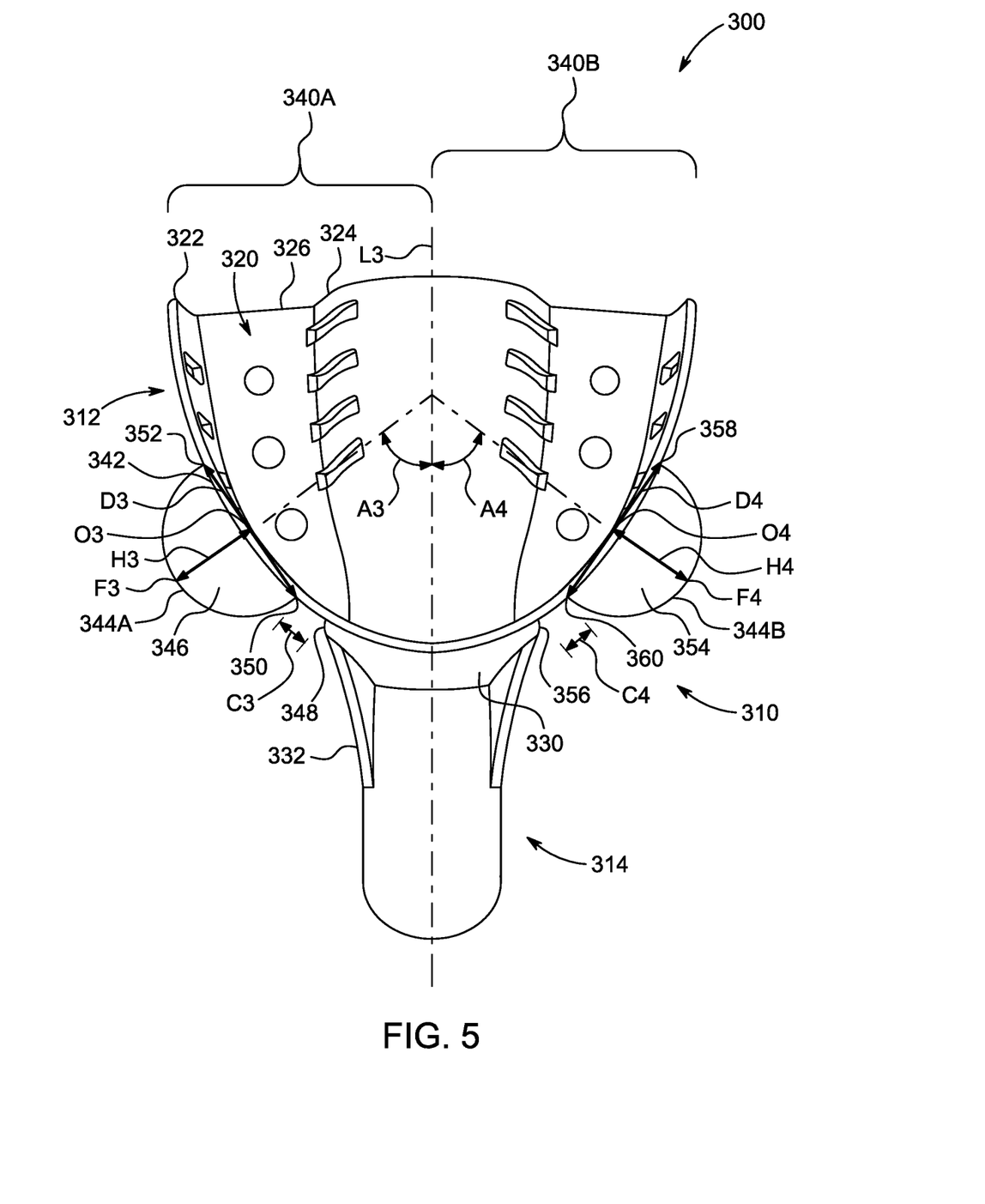
FIG. 5 is a top view of a dental impression tray device showing a pair of semi-circle shaped finger rests, according to an embodiment of the present disclosure.

Referring to FIG. 5, a top view of a dental impression tray device 300 used for taking the dental impression of the maxillary tooth structure 102 is illustrated, according to an embodiment of the present disclosure. The dental impression tray device 300 is used for holding the impression material 104 to be placed into the oral cavity 106 for taking the dental impression of the maxillary tooth structure 102. In an embodiment, the dental impression tray device 300 is made from at least one of a plastic material such as an autopolymerizing acrylic resin, a thermoplastic polymer material such as a polystyrene material polymer, a metal, a metal plated with a second material, or a non-metallic material.

The dental impression tray device 300 includes a dental impression tray 310 having a dental impression tray main body 312 and a handle bar 314 connected to the dental impression tray main body 312. The dental impression tray 310 used for taking the dental impression of the maxillary tooth structure 102 or the upper jaw is otherwise referred to as an upper dental impression tray. The dental impression tray main body 312 includes a cavity 320 in which the impression material 104 is placed. The cavity 320 is formed by an outer curvature wall surface 322, an inner curvature surface 324, and a base surface 326 connecting the outer curvature wall surface 322 and the inner curvature surface 324. The handle bar 314 is attached to a center portion 330 of the outer curvature wall surface 322. In an embodiment, the handle bar 314 is attached to the center portion 330 of the outer curvature wall surface 322 by an attachment element 332.

The dental impression tray 310 is divided into two symmetrical halves by a line of symmetry 13' that runs through middle of the handle bar 314, the attachment element 332, and the dental impression tray main body 312. The two symmetrical halves include a first symmetrical half 340A and a second symmetrical half 340B. The outer curvature wall surface 322 of the dental impression tray main body 312 includes a plurality of finger rests resting on an outer curvature wall surface arc 342. In one embodiment, the plurality of finger rests includes a first finger rest 344A and a second finger rest 344B. The first finger rest 344A is positioned in the first symmetrical half 340A and the second finger rest 344B is positioned in the second symmetrical half 340B.

The first finger rest 344A includes a flat surface 346 that extends from a first end 350 that is at a first distance 'C3' from a first end 348 of the center portion 330 of the outer curvature wall surface 322 on the first symmetrical half 340A of the dental impression tray main body 312. The flat surface 346 of the first finger rest 344A is shaped as a semi-circle. The semi-circle shape of the first finger rest 344A has a length, which is otherwise referred to as a diameter 'D3' of the semi-circle, defined between the first end 350 and a second end 352 thereof. The first end 350 of the diameter 'D3' of the semi-circle starts at the first distance 'C3' away from the first end 348 of the center portion 330 of the outer curvature wall surface 322. In an embodiment, the first distance 'C3' equals an arc length that is in a range of 0.5 cm to 1.5 cm on the outer curvature wall surface 322. In an alternate embodiment, the arc length is less than half the length of the diameter 'D3' of the semi-circle. The diameter 'D3' of the semi-circle overlays on the outer curvature wall surface 322 of the dental impression tray main body 312. In an embodiment, the diameter 'D3' of the semi-circle of the first finger rest 344A in the first symmetrical half 340A is 4 cm.

The semi-circle shape of the first finger rest 344A has a height 113' that is equal to half of the diameter 'D3' of the semi-circle. In one embodiment, the height 113' may be measured from a midpoint 'O3' on the diameter 'D3' of the semi-circle till a farthest point 'F3' on a circumference of the semi-circle away from the diameter 'D3'. In an embodiment, the height 113' of the semi-circle of the first finger rest 344A in the first symmetrical half 340A is 2 cm.

Further, the semi ellipse is positioned at a first angle 'A3' with respect to the line of symmetry 13' that runs through the middle of the dental impression tray main body 312. The first angle 'A3' is defined as an angle between a normal passing through the midpoint 'O3' of the diameter 'D3' of the semi-circle and the line of symmetry 13' that runs through the middle of the dental impression tray main body 312. In an embodiment, the first angle 'A3' is 45 degrees.

The second finger rest 344B includes a flat surface 354 that extends from a second end 360 that is at a second distance 'C4' from a second end 356 of the center portion 330 of the outer curvature wall surface 322 on the second symmetrical half 340B of the dental impression tray main body 312. The flat surface 354 of the second finger rest 344B is shaped as a semi-circle. The semi-circle shape of the second finger rest 344B has a length, which is otherwise referred to as a diameter 'D4' of the semi-circle, defined between a first end 358 and the second end 360 thereof. The second end 360 of the diameter 'D4' of the semi-circle starts at the second distance 'C4' away from the second end 356 of the center portion 330 of the outer curvature wall surface 322. In an embodiment, the second distance 'C4' equals an arc length that is in a range of 0.5 cm to 1.5 cm on the outer curvature wall surface 322. In an alternate embodiment, the arc length is less than half the length of the diameter 'D4' of the semi-circle. The diameter 'D4' of the semi-circle overlays on the outer curvature wall surface 322 of the dental impression tray main body 312. In an embodiment, the diameter 'D4' of the semi-circle of the second finger rest 344B in the second symmetrical half 340B is 4 cm.

The semi-circle shape of the second finger rest 344B has a height 114' that is equal to half of the diameter 'D4' of the semi-circle. The height 114' is measured from a midpoint 'O4' on the diameter 'D4' of the semi-circle till a farthest point 'F4' on a circumference of the semi-circle away from the diameter 'D4'. In an embodiment, the height 114' of the semi-circle of the second finger rest 344B in the second symmetrical half 340B is 2 cm.

Further, the semi-circle is positioned at a second angle 'A4' that is 45 degrees. The second angle 'A4' is an angle between a normal passing through the midpoint 'O4' of the diameter 'D4' of the semi-circle and the line of symmetry 14' that runs through the middle of the dental impression tray main body 312.

In an embodiment, the semi-circle shape of the first finger rest 344A and the second finger rest 344B may be implemented in the dental impression tray device 200 used for taking the dental impression of the mandibular teeth structure or the lower jaw. As such, a dental impression tray of the dental impression tray device, having the semi-circle shaped finger rests, used for taking the dental impression of the mandibular teeth structure or the lower jaw is referred to as a lower dental impression tray.

Figure 6:
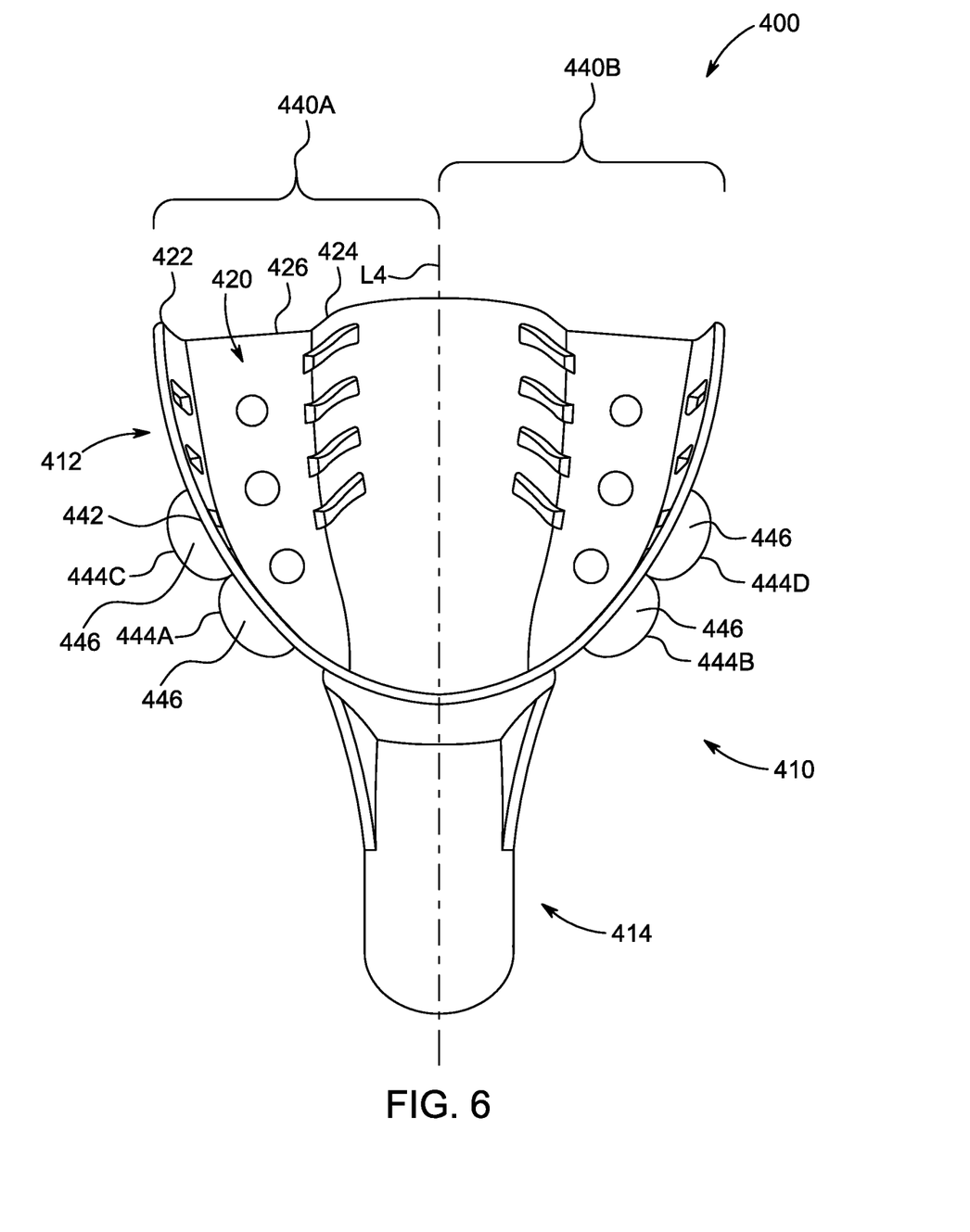
FIG. 6 is a top view of a dental impression tray device showing multiple finger rests, according to an embodiment of the present disclosure.

FIG. 6 is a top view of a dental impression tray device 400 showing multiple finger rests, according to an embodiment of the present disclosure. The dental impression tray device 400 includes a dental impression tray 410 having a dental impression tray main body 412 and a handle bar 414 connected to the dental impression tray main body 412. The dental impression tray main body 412 includes a cavity 420 in which the impression material 104 is placed. The cavity 420 is formed by an outer curvature wall surface 422, an inner curvature surface 424, and a base surface 426 connecting the outer curvature wall surface 422 and the inner curvature surface 424. The construction and dimensional specification of the dental impression tray 410 is identical to the construction and dimensional specification of the dental impression tray 110 described in FIG. 2. The dental impression tray 410 is divided into two symmetrical halves by a line of symmetry 14' that runs through middle of the handle bar 414 and the dental impression tray main body 412. The two symmetrical halves include a first symmetrical half 440A and a second symmetrical half 440B.

The outer curvature wall surface 422 of the dental impression tray main body 412 includes a plurality of finger rests resting on an outer curvature wall surface arc 442. The plurality of finger rests includes a first finger rest 444A and a second finger rest 444B positioned in the first symmetrical half 440A and the second symmetrical half 440B, respectively. Further, the plurality of the finger rests includes a third finger rest 444 C in the first symmetrical half 440A and a fourth finger rest 444D in the second symmetrical half 440B. In some embodiments, each of the first symmetrical half 440A and the second symmetrical half 440B may include more than two finger rests.

Each of the first finger rest 444A, the second finger rest 444B, the third finger rest 444C, and the fourth finger rest 444D may include a flat surface 446 that may extend from the outer curvature wall surface 422. In one embodiment, the flat surface 446 of each of the first finger rest 444A, the second finger rest 444B, the third finger rest 444C, and the fourth finger rest 444D may be shaped as a semi ellipse. In another embodiment, the flat surface 446 of each of the first finger rest 444A, the second finger rest 444B, the third finger rest 444C, and the fourth finger rest 444D may be shaped as a semi-circle. In some embodiments, the flat surface 446 of each of the first finger rest 444A, the second finger rest 444B, the third finger rest 444C, and the fourth finger rest 444D may be shaped as rounded triangle, or any other polygon shape known in the art. Diameter and height of the semi ellipse or the semi-circle shaped flat surface 446 of each of the first finger rest 444A, the second finger rest 444B, the third finger rest 444C, and the fourth finger rest 444D may be defined based on size of the dental impression tray 410 such that the dental impression tray device 400 is comfortably and conveniently placed into the oral cavity 106 of a patient.

Figure 7:
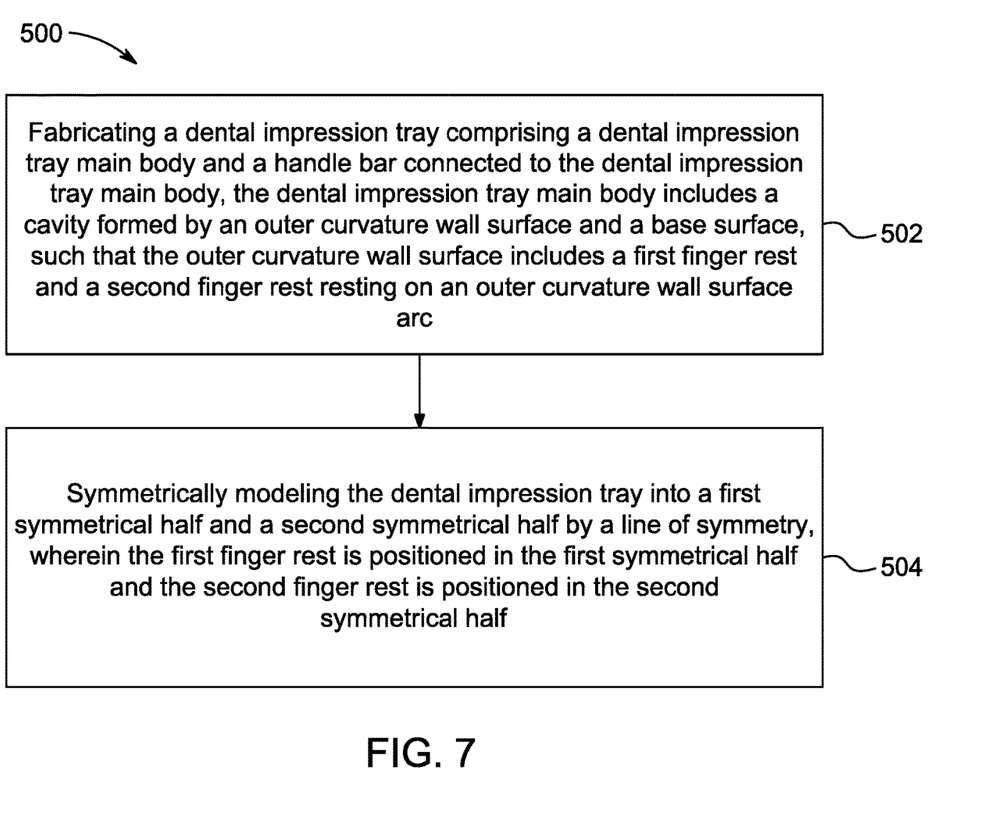
FIG. 7 is a flow diagram of a method of manufacturing the dental impression tray device of FIG. 2, according to an embodiment of the present disclosure.

FIG. 7 is a flow diagram of a method 500 of manufacturing the dental impression tray device 100 of FIG. 2, according to an embodiment of the present disclosure. Although the method 500 is illustrated with respect to the dental impression tray device 100, it may be understood that the method 500 may be implemented for manufacturing the dental impression tray devices 200, 300, and 400 without departing from the scope of present disclosure. At step 502, the method 500 includes fabricating the dental impression tray 110 having the dental impression tray main body 112 and the handle bar 114 connected to the dental impression tray main body 112. The dental impression tray 110 used for taking the dental impression of the maxillary tooth structure 102 or the upper jaw is otherwise referred to as the upper dental impression tray. The dental impression tray main body 112 includes the cavity 120 in which the impression material 104 is placed. The cavity 120 is formed by the outer curvature wall surface 122, the inner curvature surface 124, and the base surface 126 connecting the outer curvature wall surface 122 and the inner curvature surface 124. The handle bar 114 is attached to the center portion 130 of the outer curvature wall surface 122. The outer curvature wall surface 122 of the dental impression tray main body 112 includes the plurality of finger rests resting on the outer curvature wall surface arc 142. In one embodiment, the plurality of finger rests includes the first finger rest 144A and the second finger rest 144B. In an embodiment, the handle bar 114 may be attached to the center portion 130 of the outer curvature wall surface 122 by the attachment element 132.

At step 504, the method 500 includes symmetrically modeling the dental impression tray 110 into two symmetrical halves by the line of symmetry 11' that runs through middle of the handle bar 114, the attachment element 132, and the dental impression tray main body 112. The two symmetrical halves include the first symmetrical half 140A and the second symmetrical half 140B. The first finger rest 144A is positioned in the first symmetrical half 140A and the second finger rest 144B is positioned in the second symmetrical half 140B.

The first finger rest 144A includes the flat surface 146 that extends from the first end 148 of the center portion 130 of the outer curvature wall surface 122 on the first symmetrical half 140A of the dental impression tray main body 112. The flat surface 146 of the first finger rest 144A is shaped as the semi ellipse. The semi ellipse shape of the first finger rest 144A has the length, which is otherwise referred to as the diameter 'D1' of the semi ellipse, defined between the first end 150 and the second end 152 thereof. The first end 150 of the diameter 'D1' of the semi ellipse starts at the first distance 'C1' away from the first end 148 of the center portion 130 of the outer curvature wall surface 122. In an embodiment, the first distance 'C1' equals the arc length that is in the range of 0.5 cm to 1.5 cm on the outer curvature wall surface 122. In an alternate embodiment, the arc length is less than half the length of the diameter 'D1' of the semi ellipse. The diameter 'D1' of the semi ellipse overlays on the outer curvature wall surface 122 of the dental impression tray main body 112. In an embodiment, the diameter 'D1' of the semi ellipse of the first finger rest 144A in the first symmetrical half 140A is 4 cm.

The semi ellipse shape of the first finger rest 144A has the height 'H1' that is less than half of the diameter 'D1' of the semi ellipse. In one embodiment, the height 'H1' may be measured from the midpoint 'O1' on the diameter 'D1' of the semi ellipse till the farthest point 'F1' on the circumference of the semi ellipse away from the diameter 'D1'. In an embodiment, the height 'H1' of the semi ellipse of the first finger rest 144A in the first symmetrical half 144A is 1.5 cm.

Further, the semi ellipse is positioned at the first angle 'A1' with respect to the line of symmetry 'L1' that runs through the middle of the dental impression tray main body 112. The first angle 'A1' is defined as the angle between the normal passing through the midpoint 'O1' of the diameter 'D1' of the semi ellipse and the line of symmetry 'L1' that runs through the middle of the dental impression tray main body 112. In an embodiment, the first angle 'A1' is less than 50 degrees.

The second finger rest 144B includes the flat surface 154 that extends from the second end 156 of the center portion 130 of the outer curvature wall surface 122 on the second symmetrical half 140B of the dental impression tray main body 112. The flat surface 154 of the second finger rest 144B is shaped as the semi ellipse. The semi ellipse shape of the second finger rest 144B has the length, which is otherwise referred to as the diameter 'D2' of the semi ellipse, defined between the first end 158 and the second end 160 thereof. The second end 160 of the diameter 'D2' of the semi ellipse starts at the second distance 'C2' away from the second end 156 of the center portion 130 of the outer curvature wall surface 122. In an embodiment, the second distance 'C2' equals the arc length that is in the range of 0.5 cm to 1.5 cm on the outer curvature wall surface 122. In an alternate embodiment, the arc length is less than half the length of the diameter 'D2' of the semi ellipse. The diameter 'D2' of the semi ellipse overlays on the outer curvature wall surface 122 of the dental impression tray main body 112. In an embodiment, the diameter 'D2' of the semi ellipse of the second finger rest 144B in the second symmetrical half 140B is 4 cm.

The semi ellipse has the height 112' that is less than half of the diameter 'D2' of the semi ellipse. The height 112' is measured from the midpoint 'O2' on the diameter 'D2' of the semi ellipse till the farthest point 'F2' on the circumference of the semi ellipse away from the diameter 'D2'. In an embodiment, the height 112' of the semi ellipse of the second finger rest 144B in the second symmetrical half 140B is 1.5 cm.

Further, the semi ellipse is positioned at the second angle 'A2' that is less than 50 degrees. The second angle 'A2' is the angle between the normal passing through the midpoint 'O2' of the diameter 'D2' of the semi ellipse and the line of symmetry 'L1' that runs through the middle of the dental impression tray main body 112.

The dental impression tray devices 100, 200, 300, and 400 of the present disclosure help to improve the productivity of the dental impression taking procedure. More particularly, the dental impression tray devices 100, 200, 300, and 400 help the dentist to take the dental impression of the patient in a shorter time with less effort, which in turn increases the efficiency and accuracy of the overall dental impression taking procedure. Further, any injuries to the dentist or the patient due to accidental movement of the mouth of the patient may be avoided, therefore the dental impression taking procedure may become risk free. Thus, the dental impression tray devices 100, 200, 300, and 400 of the present disclosure minimize the risk of error by controlling the dental impression taking procedure and overcome the problems and shortcomings of the known dental impression tray devices.

Various, embodiments, examples and position of the components used in the disclosure are merely disclosed as an example. Any person skilled in the relevant art may perform numerous modifications and variations of the present disclosure such as position of the magnetic layers, size of the magnetic layers, shapes of the magnetic layers over the rear side of the veneer body and the facial surface of the tooth, involved in the invention in light of the above teachings. It is therefore to be understood that within the scope of the appended claims, the invention may be practiced otherwise than as specifically described herein.

The invention claimed is:

1. A method of manufacturing a dental impression tray for holding an impression material to be placed into an oral cavity for taking a dental impression, the method comprising: fabricating the dental impression tray, the dental impression tray comprising a dental impression tray main body and a handle bar connected to the dental impression tray main body, wherein the dental impression tray main body includes a cavity in which the impression material is to be placed, the cavity is formed by an outer curvature wall surface and a base surface, such that the outer curvature wall surface includes a plurality of finger rests resting on an outer curvature wall surface arc, the plurality of finger rests comprising a first finger rest and a second finger rest, and a center portion of the outer curvature wall surface is connected to the handle bar by an attachment element, the fabricating further comprising: symmetrically modeling the dental impression tray into two symmetrical halves by a line of symmetry that runs through the middle of the handle bar, the attachment element, and the dental impression tray main body, wherein the two symmetrical halves include a first symmetrical half and a second symmetrical half, wherein the first finger rest is positioned in the first symmetrical half and the second finger rest is positioned in the second symmetrical half, wherein the first symmetrical half comprising the first finger rest comprising a flat surface that extends from a first end of the center portion of the outer curvature wall surface on the first symmetrical half of the dental impression tray main body, the flat surface of the first finger rest shaped as a semi ellipse and a first end of a diameter of the semi ellipse starts at a first distance away from the first end of the center portion of the outer curvature wall surface, the first distance equals an arc length that is in a range of 0.5 cm to 1.5 cm on the outer curvature wall surface circumference and the arc length is less than half the length of the diameter of the semi ellipse, wherein the semi ellipse has a height that is less than half of the diameter of the semi ellipse, and the diameter of the semi ellipse overlays on the outer curvature wall surface of the dental impression tray main body and the height is measured from a midpoint on the diameter of the semi ellipse till a farthest point on a circumference of the semi ellipse away from the diameter, further the semi ellipse is positioned at a first angle that is less than 50 degree, such that the first angle is an angle between a normal passing through the midpoint of the diameter of the semi ellipse and the line of symmetry that runs through the middle of the dental impression tray main body; and wherein the second symmetrical half comprising: the second finger rest comprising a flat surface that extends from a second end of the center portion of the outer curvature wall surface on the second symmetrical half of the dental impression tray main body, the flat surface of the second finger rest shaped as a semi ellipse and a second end of a diameter of the semi ellipse starts at a second distance away from the second end of the center portion of the outer curvature wall surface, the second distance equals an arc length that is in the range of 0.5 cm to 1.5 cm on the outer curvature wall surface and the arc length is less than half the length of a diameter of the semi ellipse, wherein the semi ellipse has a height that is less than half of the diameter of the semi ellipse, and the diameter of the semi ellipse overlays on the outer curvature wall surface of the dental impression tray main body and the height is measured from a midpoint on the diameter of the semi ellipse till a farthest point on a circumference of the semi ellipse away from the diameter, further the semi ellipse is positioned at a second angle that is less than 50 degree, such that the second angle is an angle between a normal passing through the midpoint of the diameter of the semi ellipse and the line of symmetry that runs through the middle of the dental impression tray main body, wherein at least one finger rest is connected to the outer curvature wall surface by a hinge.

2. The method of claim 1, wherein the dental impression tray is an upper dental impression tray.

3. The method of claim 1, wherein the dental impression tray is a lower dental impression tray.

4. The method of claim 3, wherein the cavity is formed by the outer curvature wall surface, an inner curvature surface, and the base surface connecting the outer curvature surface and the inner curvature surface.

5. The method of claim 1, wherein the plurality of finger rests comprising a third finger rest in the first symmetrical half and a fourth finger rest in the second symmetrical half.

6. The method of claim 1, wherein the height of the semi ellipse corresponding to the first finger rest in the first symmetrical half and the height of the semi ellipse corresponding to the second finger rest in the second symmetrical half is 1.5 cm.

7. The method of claim 1, wherein the diameter of the semi ellipse corresponding to the first finger rest in the first symmetrical half and the diameter of the semi ellipse corresponding to the second finger rest in the second symmetrical half is 4 cm.

8. The method of claim 1, wherein the dental impression tray is made from at least one of a plastic material, a thermoplastic polymer material, a metal, a metal plated with a second material, or a non-metallic material.

* * * * *